United States Patent
Kim (10) Patent No.: US 9,926,985 B2
(45) Date of Patent: Mar. 27, 2018

(54) SLIDING BALL TYPE CONSTANT VELOCITY JOINT FOR VEHICLES

(71) Applicant: HYUNDAI WIA CORPORATION, Gyeongsangnam-do (KR)

(72) Inventor: Pil Ki Kim, Gyeonggi-do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 94 days.

(21) Appl. No.: 14/910,774

(22) PCT Filed: Aug. 9, 2013

(86) PCT No.: PCT/KR2013/007202
§ 371 (c)(1),
(2) Date: Feb. 8, 2016

(87) PCT Pub. No.: WO2015/020248
PCT Pub. Date: Feb. 12, 2015

(65) Prior Publication Data
US 2016/0201732 A1    Jul. 14, 2016

(51) Int. Cl.
| F16D 3/227 | (2006.01) |
| F16D 3/223 | (2011.01) |
| F16D 3/20 | (2006.01) |
| F16D 3/22 | (2006.01) |

(52) U.S. Cl.
CPC ............... *F16D 3/223* (2013.01); *F16D 3/20* (2013.01); *F16D 3/22* (2013.01); *F16D 3/227* (2013.01); *F16D 2003/22303* (2013.01); *Y10S 464/906* (2013.01)

(58) Field of Classification Search
CPC .............. F16D 3/227; F16D 3/22303; F16D 2003/22303; Y10S 464/906
USPC .......................................................... 464/146
See application file for complete search history.

(56) References Cited

U.S. PATENT DOCUMENTS

| 6,299,543 | B1* | 10/2001 | Sone ...................... F16D 3/227 464/146 |
| 8,267,802 | B2 | 9/2012 | Kobayashi et al. |
| 2005/0070364 | A1 | 3/2005 | Matsumoto et al. |
| 2009/0087250 | A1* | 4/2009 | Une ........................ F16D 3/227 403/59 |
| 2013/0012326 | A1* | 1/2013 | Terasaka ............... F16D 3/2237 464/145 |

FOREIGN PATENT DOCUMENTS

| JP | 2009-014036 | 1/2009 |
| JP | 4879501 | 2/2012 |
| KR | 10-2010-0079651 | 7/2010 |

OTHER PUBLICATIONS

Universal Joint and Driveshaft Design Manual, AE-7, Society of Automotive Engineers, Inc., Warrendale, PA, pp. 167-170, TJ1079. S62 1979.*
International Search Report dated May 13, 2014 for PCT/KR2013/007202.

* cited by examiner

*Primary Examiner* — Gregory Binda

(57) ABSTRACT

A sliding ball type constant velocity joint for a vehicle includes an outer race that rotates upon receiving rotational power from a transmission and that has grooves formed for use as track grooves in the inner part; an inner race installed in the outer race; ten balls for transmitting rotational power from the outer race to the inner race; and a cage for supporting the ten balls.

12 Claims, 6 Drawing Sheets

| do/PCD | 0.95 | 1.00 | 1.05 | 1.10 | 1.15 | 1.22 | 1.25 |
|---|---|---|---|---|---|---|---|
| durability (contact stress) | ◎ | ◎ | ○ | ○ | △ | △ | X |
| Cage Strength | X | △ | △ | ○ | ○ | ◎ | ◎ |

(◎:very good, ○:good, △:normal, X:poor)

FIG. 9

| di/PCD | 0.85 | 0.90 | 0.95 | 1.00 | 1.05 | 1.11 | 1.15 |
|---|---|---|---|---|---|---|---|
| durability (contact stress) | X | △ | △ | ○ | ○ | ◎ | ◎ |
| Cage Strength | ◎ | ◎ | ○ | ○ | ○ | △ | X |

(◎:very good, ○:good, △:normal, X:poor)

SLIDING BALL TYPE CONSTANT VELOCITY JOINT FOR VEHICLES

This application is the National Stage application of International Application No. PCT/KR2013/007202, filed Aug. 9, 2013, which designates the United States and was published in Korean. The International Application No. PCT/KR2013/007202 is hereby incorporated by reference in its entirety into the present application.

TECHNICAL FIELD

The present invention relates to a sliding ball type constant velocity joint for a vehicle, and more particularly, to a sliding ball type constant velocity joint for a vehicle, which distributes the load concentrated on the balls by using ten balls, thereby reducing friction between the balls and an outer race track and an inner race track, and also decreasing idle vibration when applied to automatic transmission vehicles.

BACKGROUND ART

In general, a joint functions to transmit rotational power (torque) between two rotation shafts which meet each other at an angle. In the case of a propeller shaft having a small power transmission angle, a Hooke's joint, a flexible joint, etc. are used, and in the case of the driving shaft of a front wheel drive vehicle having a large power transmission angle, a constant velocity joint is used.

Since the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine (i.e., the inboard-side end), and a ball type joint is provided to the other end of the shaft which faces a tire (i.e., the outboard-side end).

Figure 1:
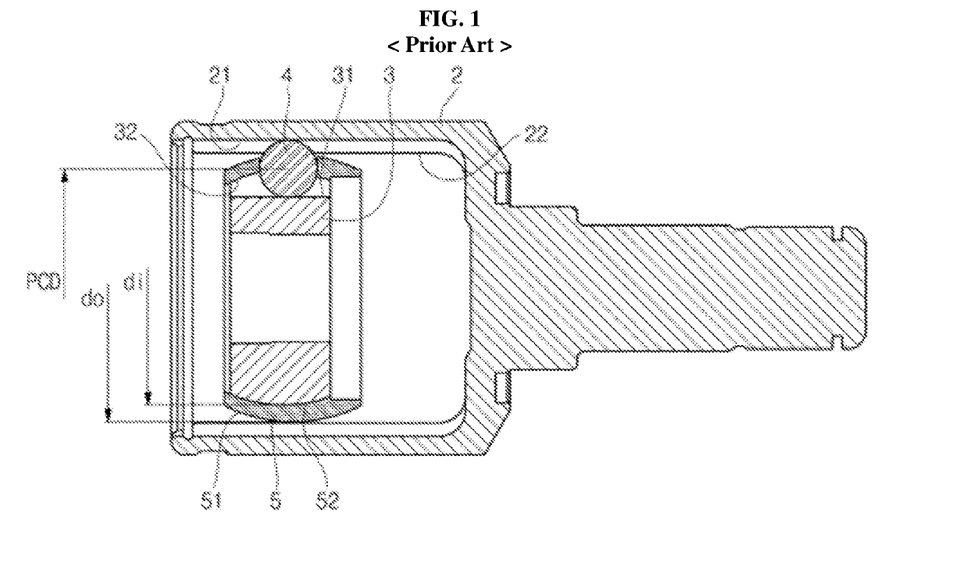
FIG. 1 is a cross-sectional view illustrating a general sliding constant velocity joint for a vehicle.

FIG. 1 is a cross-sectional view illustrating a general sliding constant velocity joint for a vehicle.

As illustrated in FIG. 1, the general sliding constant velocity joint for a vehicle includes an outer race 2 which rotates by receiving rotational power of the engine (not shown) and is defined with grooves as track grooves 21 on the inner surface thereof, an inner race 3 installed in the outer race 2, a plurality of balls 4 for transmitting the rotational power of the outer race 2 to the inner race 3, and a cage 5 for supporting the balls 4.

The outer race 2 has a track groove 21 parallel with the center axis and an inner surface 22 of a cylinder having an inner diameter do.

The inner race 3 has a track groove 31 parallel with a central axle and an outer diameter 32 of a sphere having an outer diameter di.

In general, the balls 4 include six or eight balls and have the same pitch circle diameter (PCD) and the same size.

The cage 5 has a spherical outer surface 51 having a spherical portion and a linear portion, a spherical inner surface 52 having a spherical portion, and a window grinding surface 53 by which the balls 4 are restrained.

Figure 2:
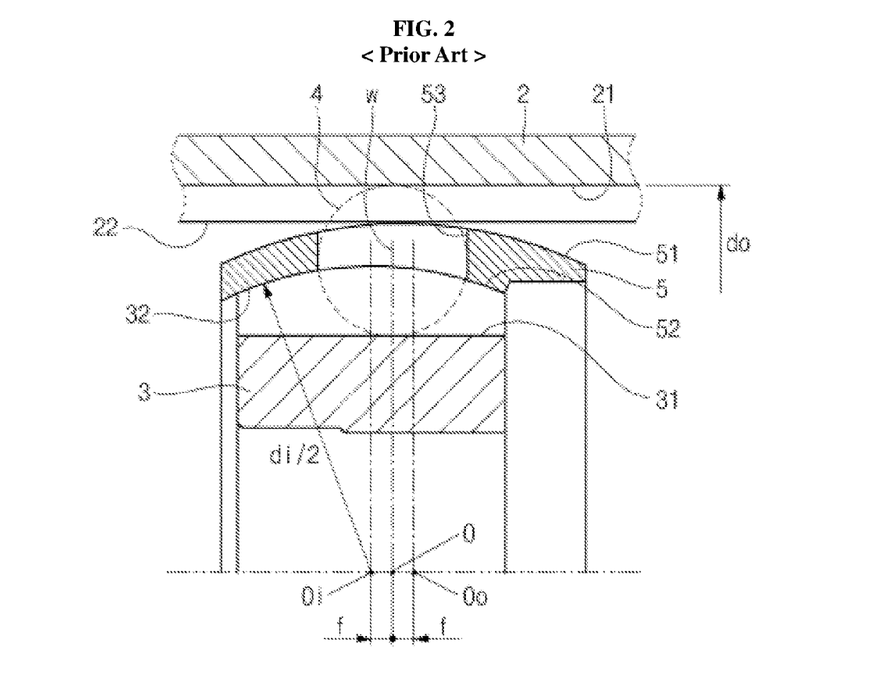
FIG. 2 is a cross-sectional view illustrating essential components of the sliding ball type constant velocity joint illustrated in FIG. 1.

The center Oi of the inner diameter of the cage 5 and the center Oo of the outer diameter of the cage 5 are symmetrically spaced an axial offset amount f apart from each other in view of a plane W passing the joint center O.

The operation of the general sliding ball type constant velocity joint for a vehicle constructed as mentioned above will now be described.

As the rotational power outputted from an engine (not shown) is transmitted to the shaft 1 through a transmission (not shown) and then transmitted to the inner race 3 through the outer race 2 and the ball 4, so that a wheel (not shown) is rotated.

The balls 4, which are restrained by the window grinding surface 53 of the cage 5 and are also restrained between the track groove 21 of the outer race 2 and the track groove 31 of the inner race 3, transmit rotational torque. In this case, the spherical inner surface 52 of the cage 5 restrains the spherical outer surface 32 of the inner race 3, and the window grinding surface 53 of the cage 5 restrains the balls 4, thereby enabling axial sliding and articulated joint movement. When the joint is articulated, the balls 4 are always positioned on the plane W to then rotate by half of the joint angle together with the cage 5.

Therefore, as the balls 4 slidably move in the track groove 21 of the outer race 2, the joint is articulated to follow the displacement of the vehicle.

However, the conventional sliding ball type constant velocity joint is configured such that axial power transmitted to the axially moving inner race 3 is transmitted to the inner spherical surface 52 of the cage 5 through the outer spherical surface 32 of the inner race 3 to push the balls 4. That is to say, the inner race 3, the cage 5, and the balls 4 are subunits, which move in the same axial direction at the same time, may not absorb idle vibration generated from the vehicle during idling but may transmit the same to a vehicle body.

DISCLOSURE OF THE INVENTION

Technical Problem

The present invention has been made in an effort to solve the problems of the prior art, and it is an object of the present invention to provide a sliding ball type constant velocity joint for a vehicle, which distributes the load concentrated on the balls by using ten balls, thereby reducing friction between the balls and an outer race track and an inner race track.

It is another object of the present invention to provide a sliding ball type constant velocity joint for a vehicle, which can decrease idle vibration when applied to automatic transmission vehicles.

Technical Solution

In accordance with an aspect of the present invention, the above and other objects can be accomplished by providing a sliding ball type constant velocity joint for a vehicle, including an outer race rotating by receiving rotational power from a transmission and having grooves used as track grooves on its inner surface, an inner race installed on an inner surface of the outer race, ten balls for transmitting the rotational power of the outer race to the inner race, and a cage for supporting the ten balls.

The ten balls may have the same pitch circle diameter (PCD) and size.

A ratio (f/PCD) of an offset (f) to PCD in each of the ten balls D may be set to be in a range of between 0.02 and 0.11.

In order to secure the entire strength of the joint, a ratio (PCD/db) of PCD to a ball diameter (db) of each ball D may be set to be in a range of between 3.4 and 5.1.

The outer race may have ten track grooves formed on the cylindrical inner surface having an inner diameter (do) of the outer race to be parallel with a central axis, and in order to secure the durability (contact stress) of the joint and the strength of the cage, a ratio (do/PCD) of the inner diameter (do) to PCD may be set to be in a range of between 1.0 and 1.22.

The inner race may have ten track grooves formed on the spherical outer surface having an outer diameter (di) of the inner race to be parallel with a central axis, and in order to secure the durability of the joint and the strength of the cage, a ratio (di/PCD) of the outer diameter (di) to PCD may be set to be in a range of between 0.9 and 1.11.

A ratio (dt/ds) of an outer diameter (dt) of the outer race to a serration pitch diameter (ds) of the inner race may be set to be in a range of between 2.4 and 3.4.

Advantageous Effects

As described above, according to the present invention, the load concentrated on the balls is distributed by using ten balls, thereby reducing friction between the balls and an outer race track and an inner race track, and also decreasing idle vibration when applied to automatic transmission vehicles.

MODE FOR CARRYING OUT THE INVENTION

Hereinafter, a preferred embodiment of the present invention will be described with reference to the accompanying drawings with several exemplary or preferred embodiments thereof. Other advantages and features of the invention will also become apparent upon reading the following detailed description and upon reference to the accompanying drawings.

However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 3:
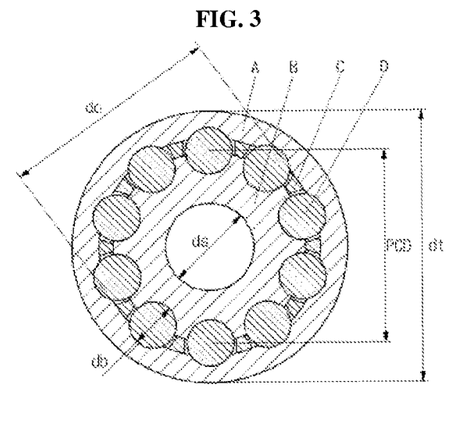
FIG. 3 is a front sectional view illustrating a sliding ball type constant velocity joint for a vehicle according to an embodiment of the present invention.

FIG. 3 is a front sectional view illustrating a sliding ball type constant velocity joint for a vehicle according to an embodiment of the present invention.

As illustrated in FIG. 3, the sliding ball type constant velocity joint for a vehicle according to an embodiment of the present invention includes an outer race A which rotates by receiving rotational power of a transmission and has grooves used as track grooves A1 on the inner surface thereof, an inner race B installed in the outer race A, ten balls D for transmitting the rotational power of the outer race A to the inner race B, and a cage C for supporting the ten balls D.

The ten balls D have the same pitch circle diameter (PCD) and the same size. In addition, a ratio (f/PCD) of an offset f to PCD in each of the ten balls D is set to be in a range of between 0.02 and 0.11. The offset f is the concept illustrated in FIG. 2.

In addition, in order to secure the entire strength of the joint, a ratio of PCD to ball diameter db of each ball D is set to be in a range of between 3.4 and 5.1, and a ratio of an outer diameter dt of the outer race A to a serration pitch diameter ds of the inner race B is set to be in a range of between 2.4 and 3.4.

The cage C has a spherical outer surface includes a spherical portion and a linear portion, a spherical inner surface having a spherical portion, and a window grinding surface restricting the ten balls D.

Figure 4:
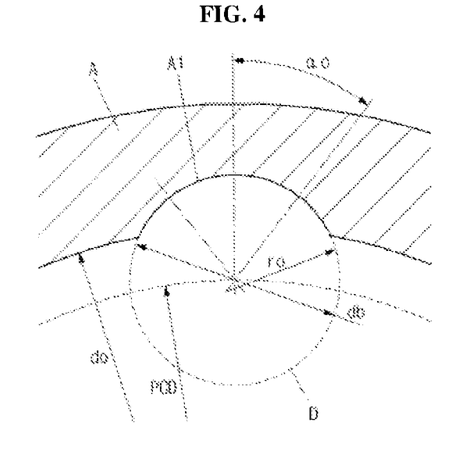
FIG. 4 is a view illustrating the relationship between pitch circle diameter (PCD) and an outer race in the sliding ball type constant velocity joint illustrated in FIG. 3.

FIG. 4 is a view illustrating the relationship between pitch circle diameter (PCD) and an outer race in the sliding ball type constant velocity joint illustrated in FIG. 3.

As illustrated in FIG. 4, in the sliding ball type constant velocity joint for a vehicle according to an embodiment of the present invention, the outer race A has ten track grooves A1 formed on a cylindrical inner surface A having an inner diameter do. In addition, in order to secure the durability of the joint and the strength of the cage C, a ratio (do/PCD) of the inner diameter do to PCD is set to be in a range of between 1.0 and 1.22. Each of the track grooves A1 has a track radius ro and a track contact angle ao.

Figure 5:
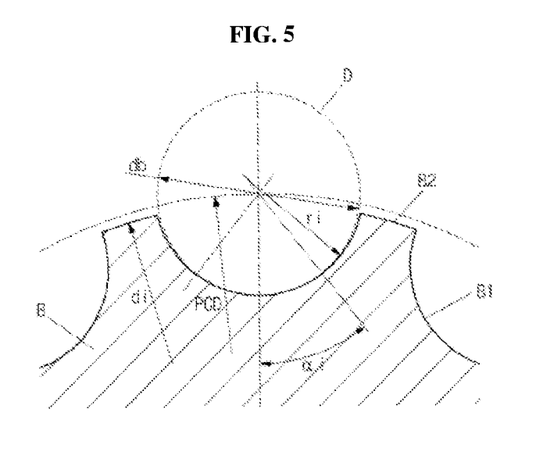
FIG. 5 is a view illustrating the relationship between pitch circle diameter (PCD) and an inner race in the sliding ball type constant velocity joint illustrated in FIG. 3.

FIG. 5 is a view illustrating the relationship between pitch circle diameter (PCD) and an inner race in the sliding ball type constant velocity joint illustrated in FIG. 3.

As illustrated in FIG. 5, in the sliding ball type constant velocity joint for a vehicle according to an embodiment of the present invention, the inner race B has ten track grooves B1 formed on the spherical outer surface B2 having an outer diameter di. In order to secure the durability of the joint and the strength of the cage C, a ratio (di/PCD) of the inner diameter dl to PCD is set to be in a range of between 0.9 and 1.11. Each of the track grooves B1 has a track radius ri and a track contact angle ai.

The aforementioned sliding ball type constant velocity joint according to an embodiment of the present invention operates as follows.

As the rotational power outputted from an engine (not shown) is transmitted to the outer race A through a transmission (not shown) and then transmitted to the inner race B through and the balls D, so that a wheel (not shown) is rotated.

The balls D are restrained by the window grinding surface of the cage C. In addition, the balls D are restrained between the track grooves A1 of the outer race A and the track grooves B1 of the inner race B to transmit rotational torque to the inner race B. In this case, the spherical inner surface C2 of the cage C restrains the spherical outer surface B2 of the inner race B, and the window grinding surface of the cage C restrains the balls D, thereby enabling axial sliding and articulated joint movement.

Figure 6:
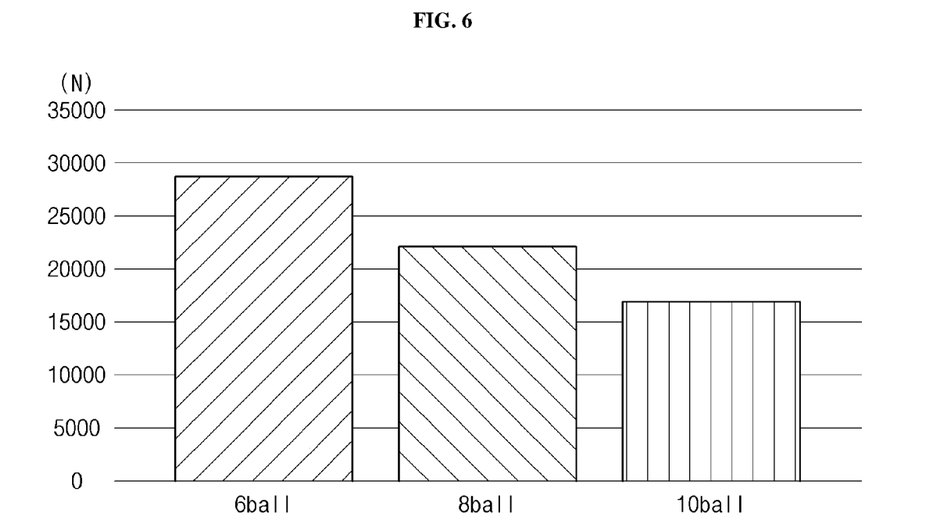
FIG. 6 is graph illustrating the load of each ball in a sliding ball type constant velocity joint for a vehicle according to an embodiment of the present invention.

When the joint is articulated, the load concentrated on each of the ten balls is distributed. FIG. 6 is graph illustrating the load of each ball in a sliding ball type constant velocity joint for a vehicle according to an embodiment of the present invention. As illustrated in FIG. 6, the ten ball type constant velocity joint has a smallest load for each ball, compared to a six ball type constant velocity joint or an eight ball type constant velocity joint.

Figure 7:
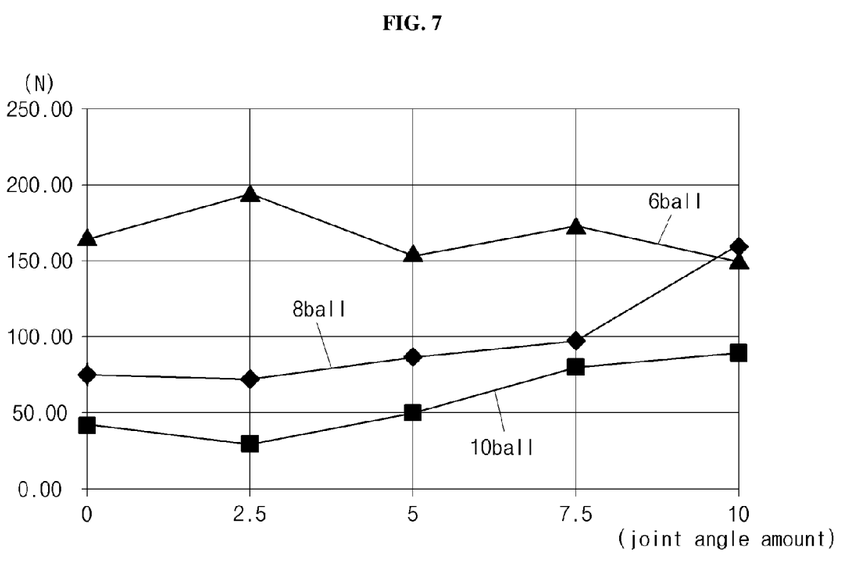
FIG. 7 is graph illustrating the idle vibration depending on the joint angle amount in a sliding ball type constant velocity joint for a vehicle according to an embodiment of the present invention.

As described above, if the load concentrated on the balls is reduced, frictions between a ball and an outer race track and between inner race tracks are reduced, thereby lowering idle vibration generated from the vehicle during idling when the ten ball type constant velocity joint is applied to an automatic transmission vehicle. FIG. 7 is graph illustrating the idle vibration depending on the joint angle amount in a sliding ball type constant velocity joint for a vehicle according to an embodiment of the present invention. As illustrated in FIG. 7, when the joint angle amount is 2.5, idling vibration can be minimized.

Therefore, as the balls D slidably move in the track grooves A1 of the outer race A, the joint is articulated to follow the displacement of the vehicle in a state in which noise and vibration are reduced.

Figure 8:
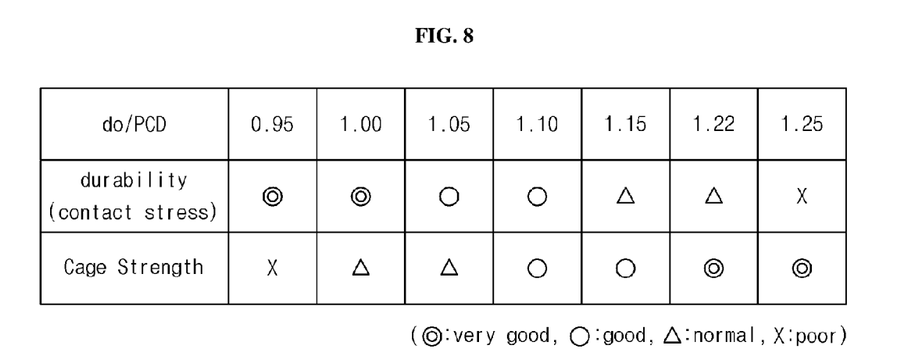
FIG. 8 is a chart for explaining durability (contact stress) and cage strength depending on the ratio of an inner diameter of an outer race to PCD in a sliding ball type constant velocity joint for a vehicle according to an embodiment of the present invention.

Meanwhile, in order to secure the durability of the joint and the strength of the cage C, a ratio (do/PCD) of the inner diameter (do) to PCD is set to be in a range of between 1.0 and 1.22. FIG. 8 is a chart for explaining durability (contact stress) and cage strength depending on the ratio of an inner diameter of an outer race to PCD in a sliding ball type constant velocity joint for a vehicle according to an embodiment of the present invention. As illustrated in FIG. 8, if the ratio (do/PCD) of the inner diameter (do) to PCD is 1.0 or less, the cage strength may become poor, and if the ratio (do/PCD) of the inner diameter (do) to PCD is 1.22 or greater, the contact stress may become poor.

Figure 9:
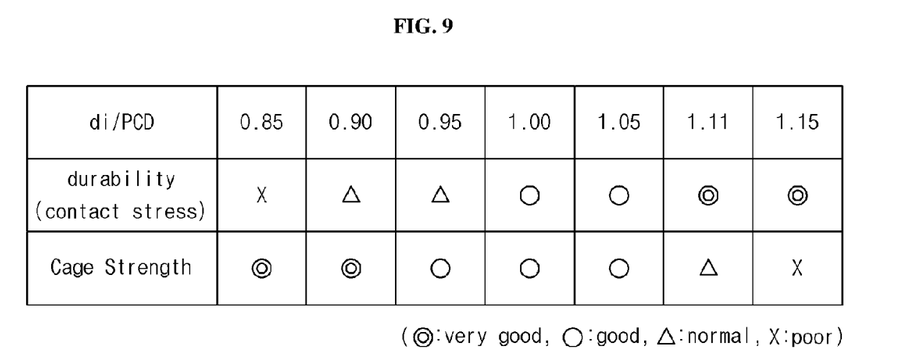
FIG. 9 is a chart for explaining durability (contact stress) and cage strength depending on the ratio of an outer diameter of an inner race to PCD in a sliding ball type constant velocity joint for a vehicle according to an embodiment of the present invention.

In addition, in order to secure the durability of the joint and the strength of the cage C, a ratio (di/PCD) of the outer diameter (di) to PCD is set to be in a range of between 0.9 and 1.11. FIG. 9 is a chart for explaining durability (contact stress) and cage strength depending on the ratio of an outer diameter of an inner race to PCD in a sliding ball type constant velocity joint for a vehicle according to an embodiment of the present invention. As illustrated in FIG. 9, if the ratio (di/PCD) of the outer diameter (di) to PCD is 0.9 or less, the contact stress may become poor, and the ratio (di/PCD) of the outer diameter (di) to PCD is 1.11 or greater, the cage strength may become poor.

INDUSTRIAL APPLICABILITY

The present invention can be applied to a field of automotive vehicles.

The invention claimed is:

1. A sliding ball type constant velocity joint for a vehicle comprising:
    an outer race rotating by receiving rotational power from a transmission and having grooves used as track grooves on its inner surface;
    an inner race installed on an inner surface of the outer race;
    ten balls for transmitting the rotational power of the outer race to the inner race; and
    a cage for supporting the ten balls,
    wherein the outer race has ten track grooves formed on a cylindrical inner surface having an inner diameter (do) of the outer race to be parallel with a central axis, and in order to secure the durability of the joint and the strength of the cage, a ratio (do/PCD) of the inner diameter (do) to PCD is set to be in a range of between 1.0 and 1.22.

2. The sliding ball type constant velocity joint of claim 1, wherein the ten balls have the same PCD and size.

3. The sliding ball type constant velocity joint of claim 1, wherein a ratio (f/PCD) of an offset (f) to PCD in each of the ten balls (D) is set to be in a range of between 0.02 and 0.11.

4. The sliding ball type constant velocity joint of claim 1, wherein in order to secure the entire strength of the joint, a ratio (PCD/db) of PCD to a ball diameter (db) of each ball (D) is set to be in a range of between 3.4 and 5.1.

5. The sliding ball type constant velocity joint of claim 1, wherein the inner race has ten track grooves formed on a spherical outer surface having an outer diameter (di) of the inner race to be parallel with a central axis, and in order to secure the durability of the joint and the strength of the cage, a ratio (di/PCD) of the outer diameter (di) to PCD is set to be in a range of between 0.9 and 1.11.

6. The sliding ball type constant velocity joint of claim 1, wherein a ratio (dt/ds) of an outer diameter (dt) of the outer race to a serration pitch diameter (ds) of the inner race is set to be in a range of between 2.4 and 3.4.

7. A sliding ball type constant velocity joint for a vehicle comprising:
    an outer race rotating by receiving rotational power from a transmission;
    an inner race installed on an inner surface of the outer race;
    a plurality of balls for transmitting the rotational power of the outer race to the inner race; and
    a cage for supporting the balls, the cage comprises:
        a spherical outer surface;
        a spherical inner surface; and
        a window grinding surface restricting the balls,
    wherein the outer race has ten track grooves formed on a cylindrical inner surface having an inner diameter (do) of the outer race to be parallel with a central axis, and in order to secure the durability of the joint and the strength of the cage, a ratio (do/PCD) of the inner diameter (do) to PCD is set to be in a range of between 1.0 and 1.22.

8. The sliding ball type constant velocity joint of claim 7, wherein the balls have the same PCD and size.

9. The sliding ball type constant velocity joint of claim 7, wherein a ratio (f/PCD) of an offset (f) to PCD in each of the balls (D) is set to be in a range of between 0.02 and 0.11.

10. The sliding ball type constant velocity joint of claim 7, wherein in order to secure the entire strength of the joint, a ratio (PCD/db) of PCD to a ball diameter (db) of each ball (D) is set to be in a range of between 3.4 and 5.1.

11. The sliding ball type constant velocity joint of claim 7, wherein the inner race has ten track grooves formed on a spherical outer surface having an outer diameter (di) of the inner race to be parallel with a central axis, and in order to secure the durability of the joint and the strength of the cage, a ratio (di/PCD) of the outer diameter (di) to PCD is set to be in a range of between 0.9 and 1.11.

12. The sliding ball type constant velocity joint of claim 7, wherein a ratio (dt/ds) of an outer diameter (dt) of the outer race to a serration pitch diameter (ds) of the inner race is set to be in a range of between 2.4 and 3.4.

* * * * *